United States Patent [19]

Wendt et al.

[11] 4,181,774
[45] Jan. 1, 1980

[54] ELECTROMAGNETIC INTERFERENCE FILTER WINDOW

[75] Inventors: Jerry P. Wendt, Arcadia, Calif.; Andrew J. Steckl, Ballston Spa, N.Y.

[73] Assignee: The United States of America as represented by the Secretary of the Air Force, Washington, D.C.

[21] Appl. No.: 970,947

[22] Filed: Dec. 19, 1978

[51] Int. Cl.² ............... B32B 17/06; C03C 17/22
[52] U.S. Cl. ............... 428/335; 204/192 P; 350/164; 350/311; 350/1.6; 331/94.5 G; 427/162; 427/165; 428/34; 428/433; 428/469
[58] Field of Search ............... 428/335, 332, 469, 34, 428/433; 427/162, 165; 204/192 P; 350/1, 164, 311; 331/94.5 G

[56] References Cited

U.S. PATENT DOCUMENTS

| | | | |
|---|---|---|---|
| 2,415,352 | 2/1947 | Iams | 350/153 X |
| 3,569,858 | 3/1971 | Witteman | 331/94.5 G |
| 3,671,286 | 6/1972 | Fischell | 428/332 |
| 3,815,036 | 6/1974 | Nozik | 350/1 X |
| 3,920,533 | 11/1975 | Pompei | 204/192 P |
| 3,935,351 | 1/1976 | Franz | 428/34 |
| 3,958,042 | 5/1976 | Katsube et al. | 427/162 |

Primary Examiner—Herbert, Jr., Thomas J.
Attorney, Agent, or Firm—Joseph E. Rusz; William J. O'Brien

[57] ABSTRACT

A laser window material for use in the infrared wavelength spectrum comprising a glass substrate having an indium tin oxide conductive film deposited in one surface thereof and magnesium fluoride antireflection films deposited atop the conductive film and the opposite surface of the glass substrate.

3 Claims, 1 Drawing Figure

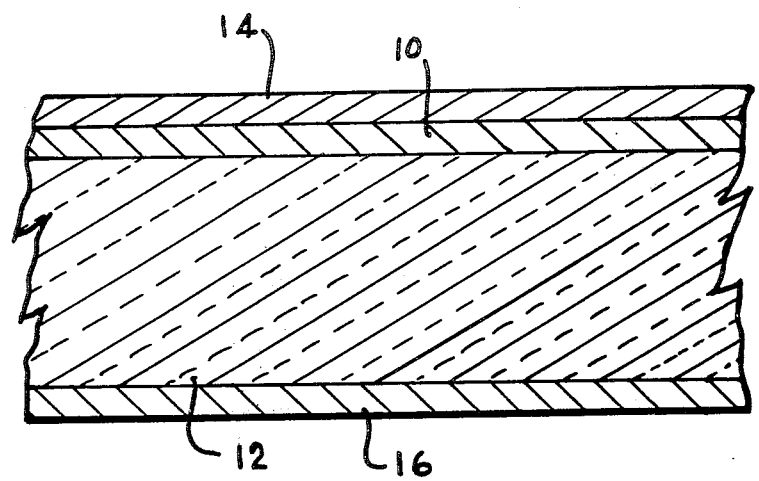

ELECTROMAGNETIC INTERFERENCE FILTER WINDOW

STATEMENT OF GOVERNMENT INTEREST

The invention described herein may be manufactured and used by or for the Government for governmental purposes without the payment of any royalty thereon.

BACKGROUND OF THE INVENTION

This invention relates to a laser window material. More particularly, this invention relates to a laser window material which can transmit infrared radiation while simultaneously providing electromagnetic interference protection.

Recent advances in the field of laser technology have created a need for laser window materials capable of transmitting radiant energy in the infrared wavelength spectrum. The window materials also must be capable of providing electromagnetic interference protection as well as mechanical strength and stability.

As is well known, a laser window is a passive device which functions as a physical barrier between a laser device and its outside environment to prevent the escape of gaseous material from the laser. The window must also transmit the laser energy essentially in unaffected form and, therefore, must be highly transparent and conductive to the particular wavelength of radiation being generated. The transmission of infrared radiation, for example, presents a number of problems requiring special materials capable of handling large amounts of infrared laser energy.

Practical applications, especially for military requirements, mandate a material that possesses not only high conductivity, but also a combination of structural and optical integrity of the highest order. They must be capable of withstanding the excessive mechanical stress and strain encountered within a military operational environment. Structural integrity implies mechanical rigidity which precludes the use of gases or liquids as a window material. The material must be durable and therefore, solid materials lacking in hardness, chemical inertness, high melting point, mechanical strength and insolvency cannot utilized.

A number of materials have been suggested for use as infrared transmitting windows but, unfortunately, these materials lacked the necessary electromagnetic interference protection characteristics required for certain applications such as for use in laser seekers and the like. With the present invention, however, the problem of providing a laser window material which is highly transparent to infrared radiation, as well as capable of providing a high degree of electromagnetic interference protection, has been overcome.

SUMMARY OF THE INVENTION

In accordance with the present invention, there is provided an electromagnetic interference protective window which is highly transparent and conductive to high energy laser radiation in the infrared wavelength spectrum. The material possesses the degree of mechanical strength and structural and optical integrity which makes it especially useful for military laser applications. The window comprises a glass substrate having a coating of indium tin oxide on one surface thereof. A magnesium fluoride coating is deposited on top of the indium tin oxide coating as well as on the opposite surface of the glass substrate to form a sandwich type structure.

Accordingly, the primary object of this invention is to provide a material suitable for use as an infrared laser window material.

Another object of this invention is to provide a window material which is capable of transmitting radiation in the infrared wavelength region while simultaneously providing electromagnetic interference protection.

Still another object of this invention is to provide an infrared laser window material that possesses the requisite strength and stability to withstand the stress and strain encountered within a military operational environment.

The above and still other objects and advantages of the present invention will become more readily apparent upon consideration of the following detailed description thereof when taken in conjunction with the accompanying drawing.

DESCRIPTION OF THE DRAWING

In the drawing:

The FIGURE represents a cross-sectional view, in exploded form, of the laser window material of this invention.

DESCRIPTION OF THE PREFERRED EMBODIMENT

Pursuant to the above-defined objects the present invention concerns itself with a process for fabricating a laser window material that is not only capable of transmitting infrared radiation but also provides electromagnetic interference protection coupled with mechanical strength and stability. The window comprises a sandwich type structure as shown by the drawing.

In the drawing, the window comprises an indium tin oxide coating 10, approximately 1000 Å thick, deposited on a glass substrate 12 to form a highly transparent and conductive film. An antireflection coating 14 of magnesium fluoride, about 1400 Å thick, is deposited over the indium tin-oxide. A second antireflection coating 16 of magnesium fluoride of about 2000 Å thick is then applied to the other side of the substrate 12.

The indium tin oxide film, hereinafter refined to as ITO, is deposited by d.c. sputtering onto the glass substrate 12. The window is capable of operation at a wavelength of 1.06 um with a transmission of 97 percent and a sheet resistance of 100 ohms per square. A Sloan Sputtergun system in an argon partial pressure can be utilized for sputtering the film. Films with as Sn/In ratio of 10/90 and a thickness of 1000 Å ±50 Å were deposited on the glass substrate 12. Subsequently, the coated substrate 12 was annealed at a temperature of 270° C. in forming gas for one hour followed by a five hour anneal in air at a temperature of 270° C. After annealing the magnesium antireflection coatings 14 and 16 were deposited by utilizing conventional evaporation techniques.

The invention describes an infrared laser window material which exhibits high infrared wavelength transmission, electromagnetic interference protection and an enhanced mechanical strength and stability. These characteristics make the window especially valuable for use in a variety of military applications without the fear of mechanical breakdown. The window shows excellent transmission capabilities on the order of 97 percent with a sheet resistance of 100 ohms per square.

While the invention has been described by referring to a specific embodiment thereof, it is to be understood that the present disclosure is offered for the purpose of illustration only and is not intended to limit the invention in anyway. It should be obvious to those skilled in the art that various alterations and modifications may be made without departing from the spirit of the invention, the scope of which is defined by the appended claims.

What is claimed is:
1. A laser window material comprising
  (a) a glass substrate;
  (b) a thin sputtered coating of an indium tin oxide alloy deposited on one surface of said substrate;
  (c) a first, thin, magnesium fluoride coating deposited on said sputtered coating; and
  (d) a second, thin, magnesium fluoride coating deposited on the other surface of said substrate.
2. A laser window material in accordance with claim 1 wherein said sputtered coating is approximately 1000 Å in thickness.
3. A laser window material in accordance with claim 2 wherein said first magnesium fluoride coating is approximately 1400 Å in thickness and said second magnesuim fluoride coating is approximately 2000 Å in thickness.

* * * * *